United States Patent
Park et al.

(10) Patent No.: US 11,127,967 B2
(45) Date of Patent: Sep. 21, 2021

(54) HIGH TEMPERATURE-TYPE UNITIZED REGENERATIVE FUEL CELL USING WATER VAPOR AND METHOD OF OPERATING THE SAME

(71) Applicant: KOREA INSTITUTE OF SCIENCE AND TECHNOLOGY, Seoul (KR)

(72) Inventors: Hyun Seo Park, Seoul (KR); Ahyoun Lim, Seoul (KR); Ju Sung Lee, Seoul (KR); Hee-Young Park, Seoul (KR); So Young Lee, Seoul (KR); Jin Young Kim, Seoul (KR); Sung Jong Yoo, Seoul (KR); Dirk Henkensmeier, Seoul (KR); Jong Hyun Jang, Seoul (KR); Hyoung-Juhn Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 74 days.

(21) Appl. No.: 16/814,619

(22) Filed: Mar. 10, 2020

(65) Prior Publication Data
US 2021/0066741 A1     Mar. 4, 2021

(30) Foreign Application Priority Data
Sep. 3, 2019   (KR) .................. 10-2019-0109001

(51) Int. Cl.
*H01M 8/18* (2006.01)
*H01M 8/1004* (2016.01)
(Continued)

(52) U.S. Cl.
CPC ......... *H01M 8/186* (2013.01); *H01M 4/8657* (2013.01); *H01M 4/9025* (2013.01);
(Continued)

(58) Field of Classification Search
CPC .. H01M 8/186; H01M 8/1004; H01M 8/1231; H01M 4/92; H01M 4/8657;
(Continued)

(56) References Cited

U.S. PATENT DOCUMENTS 10,355,299 B2     7/2019   Bae et al.
2013/0146471 A1*  6/2013   Dubois ............... H01M 4/8605
                                                       205/343
(Continued)

FOREIGN PATENT DOCUMENTS

JP    2013-44032 A    3/2013
JP    2018-188701 A   11/2018
(Continued)

OTHER PUBLICATIONS

Chen et al., "Development of Supported Bifunctional Electrocatalysts for Unitized Regenerative Fuel Cells", Journal of the Electrochemical Society, 2002, vol. 149, No. 8, pp. A1092-A1099.
(Continued)

*Primary Examiner* — Stewart A Fraser
(74) *Attorney, Agent, or Firm* — Birch, Stewart, Kolasch & Birch, LLP (57) ABSTRACT

Disclosed is a high temperature-type unitized regenerative fuel cell using water vapor, which exhibits high hydrogen ($H_2$) production efficiency and superior power generation ability.

16 Claims, 7 Drawing Sheets

(51) Int. Cl.
| | | |
|---|---|---|
| H01M 8/1231 | (2016.01) | |
| H01M 4/92 | (2006.01) | |
| H01M 4/86 | (2006.01) | |
| H01M 4/90 | (2006.01) | |
| H01M 8/1018 | (2016.01) | |

(52) U.S. Cl.
CPC ........... *H01M 4/92* (2013.01); *H01M 8/1004* (2013.01); *H01M 8/1231* (2016.02); *H01M 2008/1095* (2013.01); *H01M 2300/0068* (2013.01)

(58) Field of Classification Search
CPC ....... H01M 4/9025; H01M 2300/0068; H01M 2008/1095
See application file for complete search history.

(56) References Cited

U.S. PATENT DOCUMENTS

| | | | |
|---|---|---|---|
| 2017/0187042 A1 | 6/2017 | Jang et al. | |
| 2018/0327917 A1* | 11/2018 | Beachy | H01M 8/2483 |
| 2018/0358641 A1* | 12/2018 | Lewinski | H01M 8/1004 |
| 2019/0296380 A1* | 9/2019 | Iida | H01M 8/1004 |

FOREIGN PATENT DOCUMENTS

| | | |
|---|---|---|
| KR | 2000-0048799 A | 7/2000 |
| KR | 10-0773322 B1 | 11/2007 |
| KR | 10-1639536 B1 | 7/2016 |
| KR | 10-1836678 B1 | 3/2018 |
| KR | 10-1870209 B1 | 7/2018 |
| KR | 10-1884642 B1 | 8/2018 |
| WO | WO 98/14505 A1 | 4/1998 |

OTHER PUBLICATIONS

Ioroi et al., "Iridium Oxide/Platinum Electrocatalysts for Unitized Regenerative Polymer Electrolyte Fuel Cells", Journal of the Electrochemical Society, 2000, vol. 147, No. 6, pp. 2018-2022.
Sadhasivam et al., "A comprehensive review on unitized regenerative fuel cells: Crucial challenges and developments", International Journal of Hydrogen Energy, 2017, vol. 42, No. 7, pp. 4415-4433.
Salzano et al., "Water Vapor Electrolysis at High Temperature: Systems Considerationsand Benefits", International Journal of Hydrogen Energy, 1985, vol. 10, No. 12, pp. 801-809.
Sun et al., "High temperature proton exchange membranes based on cerium sulfophenyl phosphate doped polybenzimidazole by end-group protection and hot-pressing method", International Journal of Hydrogen Energy, 2017, vol. 42, pp. 486-495.
Wang et al., "A review on unitized regenerative fuel cell technologies, part B: Unitized regenerative alkaline fuel cell, solid oxide fuel cell, and microfluidic fuel cell", Renewable and Sustainable Energy Reviews, 2017, vol. 75, pp. 775-795.

* cited by examiner

Ultrasonic Humidification Method

FIG. 3B

Direct Vaporization Method

HIGH TEMPERATURE-TYPE UNITIZED REGENERATIVE FUEL CELL USING WATER VAPOR AND METHOD OF OPERATING THE SAME

CROSS-REFERENCE TO RELATED APPLICATION

This application claims the priority of Korean Patent Application No. 10-2019-0109001, filed on Sep. 3, 2019, and all the benefits accruing therefrom under 35 U.S.C. § 119, the contents of which in their entirety are herein incorporated by reference.

BACKGROUND

1. Field

The present disclosure relates to a high temperature-type unitized regenerative fuel cell (URFC) using water vapor and a method of operating the same. More specifically, the URFC of the present disclosure can be operated at high temperatures of 120° C. or above while minimizing the flow rate of water in liquid form by supplying water vapor to a first electrode including an OER (oxygen evolution reaction) catalyst during water electrolysis operation and has high water electrolysis efficiency and thermal efficiency due to low threshold voltage of hydrogen production by water electrolysis.

[Description of Government-Supported Research and Development]

This research was organized by Nexcoms Co., Ltd. and supported by the Ministry of Trade, Industry and Energy of Korea (project title: Research and development (R&D) of core technology for new renewable energy, project name: Development of ultralight 9-kW PEMFC multicopter system; project number: 1415159310).

This research was organized by Korea Electric Power Corporation and supported by the Ministry of Trade, Industry and Energy of Korea (project title: Development of energy technology (power-to-gas technology); project name: Development of technology for production and storage of green hydrogen by 2-MW hybrid water electrolysis for maximized use of renewable energy; project number: 2019281010007A).

This research was organized by the Korea Institute of Science and Technology and supported by the Ministry of Science and ICT of Korea (project title: Research and development (R&D) of breakthrough technology for hydrogen energy; project name: Development of high-performance polymer electrolyte membrane (PEM) water electrolysis membrane electrode assembly and stack technology; project number: 1711096787).

2. Description of the Related Art

A regenerative polymer electrolyte membrane fuel cell (R-PEMFC) system consisting of a polymer electrolyte membrane water electrolysis (PEMWE) unit and a polymer electrolyte membrane fuel cell (PEMFC) is a promising system for energy storage and conversion for use in uninterruptible power supplies, solar-powered aircrafts, satellites and micro-spacecrafts, and certain ground vehicles.

In addition, the R-PEMFC system is potentially useful in leveling the load of power distributed from power sources such as a wind turbine or a solar cell. The R-PEMFC system is advantageous for long-term energy storage when compared with secondary batteries, provides high energy storage with minimum weight, i.e., high energy density, and, most importantly, is very environment-friendly since no pollutant is generated (non-patent document 1: Chen, Guoying, Simon R. Bare, and Thomas E. Mallouk. "Development of supported bifunctional electrocatalysts for unitized regenerative fuel cells." Journal of the Electrochemical Society 149.8 (2002): A1092-A1099, non-patent document 2: Ioroi, Tsutomu, et al. "Iridium oxide/platinum electrocatalysts for unitized regenerative polymer electrolyte fuel cells." Journal of the Electrochemical Society 147.6 (2000): 2018-2022).

However, the R-PEMFC system is disadvantageous in terms of space and cost since the fuel cell and the water electrolysis unit are not unitized. Recently, a unitized regenerative polymer electrolyte membrane fuel cell (UR-PEMFC) is researched to overcome this disadvantage. The UR-PEMFC is advantageous in terms of cost saving and space utilization as well as very high energy density (theoretically 3660 Wh/kg) since hydrogen production and power generation can be achieved with one PEM unit of the R-PEMFC system in PEMWE and PEMFC modes.

However, since the PEM used in the UR-PEMFC is mostly based on Nafion, there are limitations in that the ion conductivity of the polymer electrolyte membrane is decreased under low-humidity environments and the operating temperature should be maintained low in order to avoid the melting of the polymer membrane at high temperatures (non-patent document 3: Sadhasivam, T., et al. "A comprehensive review on unitized regenerative fuel cells: crucial challenges and developments." International Journal of Hydrogen Energy 42.7 (2017): 4415-4433).

SUMMARY

Exemplary embodiments of the present disclosure provide a high temperature-type unitized regenerative fuel cell operable in a temperature range of 120-200° C., which overcomes the operating temperature limitation of the existing UR-PEMFC by using a PBI-based polymer electrolyte membrane doped with phosphoric acid having a boiling point higher than 158° C. and conducting electrolysis of gaseous water vapor, and a method of operating the same.

An exemplary embodiment of the present disclosure provides a membrane electrode assembly for a unitized regenerative fuel cell, which includes: a first electrode including an OER (oxygen evolution reaction) catalyst and a HOR (hydrogen oxidation reaction)/ORR (oxygen reduction reaction) catalyst; a second electrode including a HOR (hydrogen oxidation reaction)/HER (hydrogen evolution reaction)/ORR (oxygen reduction reaction) catalyst; a polymer electrolyte membrane capable of conducting cations, which is provided between the first electrode and the second electrode; and a water vapor supply unit for supplying water vapor to the first electrode, wherein the first electrode is an oxidation electrode during water electrolysis operation and an oxidation electrode or a reduction electrode during fuel cell operation, and the second electrode is a reduction electrode during water electrolysis operation and an oxidation electrode or a reduction electrode during fuel cell operation.

An exemplary embodiment of the present disclosure provides a unitized regenerative fuel cell including the membrane electrode assembly for a unitized regenerative fuel cell described above.

An exemplary embodiment of the present disclosure provides a method for operating a unitized regenerative fuel cell, wherein the method for operating a unitized regenerative fuel cell includes: a water electrolysis operation step wherein the first electrode is used as an oxidation electrode and the second electrode is used as a reduction electrode; and a fuel cell operation step wherein the first electrode is used as an oxidation electrode or a reduction electrode and the second electrode is used as a reduction electrode or an oxidation electrode, and water vapor is supplied to the first electrode during the water electrolysis operation step, wherein the unitized regenerative fuel cell includes: a first electrode including an OER (oxygen evolution reaction) catalyst and a HOR (hydrogen oxidation reaction)/ORR (oxygen reduction reaction) catalyst; a second electrode including a HOR (hydrogen oxidation reaction)/HER (hydrogen evolution reaction)/ORR (oxygen reduction reaction) catalyst; a polymer electrolyte membrane capable of conducting cations, which is provided between the first electrode and the second electrode; and a water vapor supply unit for supplying water vapor to the first electrode.

The unitized regenerative fuel cell according to exemplary embodiments of the present disclosure exhibits relatively higher heat recovery rate as compared to the existing UR-PEMFC due to high operating temperature (120-200° C.). In addition, it has low threshold voltage and can be operated in a fuel cell (FC) mode even with low-purity hydrogen. Furthermore, the system can be miniaturized easily because a humidifier is unnecessary. In addition, the problem due to the loss and leakage of phosphoric acid is decreased since the system is a closed system wherein water and gas are circulated in the fuel cell (FC) mode and the water electrolysis (WE) mode. In addition, the unitized regenerative high temperature-type polymer electrolyte membrane fuel cell (UR-HTPEMFC) is expected to be a very suitable energy storage and power generation system in the next-generation smart grid power generation system due to the energy storage through use of surplus power by the URFC.

DETAILED DESCRIPTION

Hereinafter, specific exemplary embodiments of the present disclosure are described in detail referring to the attached drawings.

The exemplary embodiments of the present disclosure are given only as examples for the purpose of description. The exemplary embodiments of the present disclosure may be embodied in various forms without being limited to the exemplary embodiments described in this specification.

It is to be understood that the present disclosure can be changed variously and may be embodied into various forms, and the exemplary embodiments are not intended to limit the present disclosure but to include all modifications, equivalents and substitutes included in the idea and technical scope of the present disclosure.

In the present disclosure, when a part is described to "include" an element, it does not exclude the presence of another element unless the context clearly indicates otherwise.

Unitized Regenerative Fuel Cell

Exemplary embodiments of the present disclosure provide a membrane electrode assembly for a unitized regenerative fuel cell, which includes: a first electrode including an OER (oxygen evolution reaction) catalyst and a HOR (hydrogen oxidation reaction)/ORR (oxygen reduction reaction) catalyst; a second electrode including a HOR (hydrogen oxidation reaction)/HER (hydrogen evolution reaction)/ORR (oxygen reduction reaction) catalyst; a polymer electrolyte membrane capable of conducting cations, which is provided between the first electrode and the second electrode; and a water vapor supply unit for supplying water vapor to the first electrode, wherein the first electrode is an oxidation electrode during water electrolysis operation and an oxidation electrode or a reduction electrode during fuel cell operation, and the second electrode is a reduction electrode during water electrolysis operation and an oxidation electrode or a reduction electrode during fuel cell operation.

The existing unitized regenerative fuel cells (URFCs) include a unitized regenerative polymer electrolyte membrane fuel cell (UR-PEMFC), a unitized regenerative alkaline fuel cell (UR-AFC), a unitized regenerative solid oxide fuel cell (UR-SOFC), etc. Among them, the UR-PEMFC is mainly used. As the operating temperature is increased, the threshold voltage of the PEMWE tends to decrease and the operation efficiency of the PEMWE and the PEMFC tends to increase. However, there is a limitation in that operation is possible only in a temperature range of 60-120° C. due to the low glass transition temperature of Nafion, which is mainly used as an electrolyte membrane, and the boiling point of water, which is used as an electrolyte.

In addition, because the UR-PEMFC and the UR-AFC are operated at low temperatures to prevent the poisoning of an electrode catalyst due to impurities, high-purity hydrogen should be used and heat recovery rate is relatively poor. And, the UR-SOFC is limited in applications because it is operated in a temperature range of 500-1000° C. Therefore, in order to solve the above-described problems, the present disclosure is directed to providing a UR-HTPEMFC operated in the intermediate temperature range of 120-200° C., between the low-temperature and ultra-high-temperature ranges.

Figure 1:
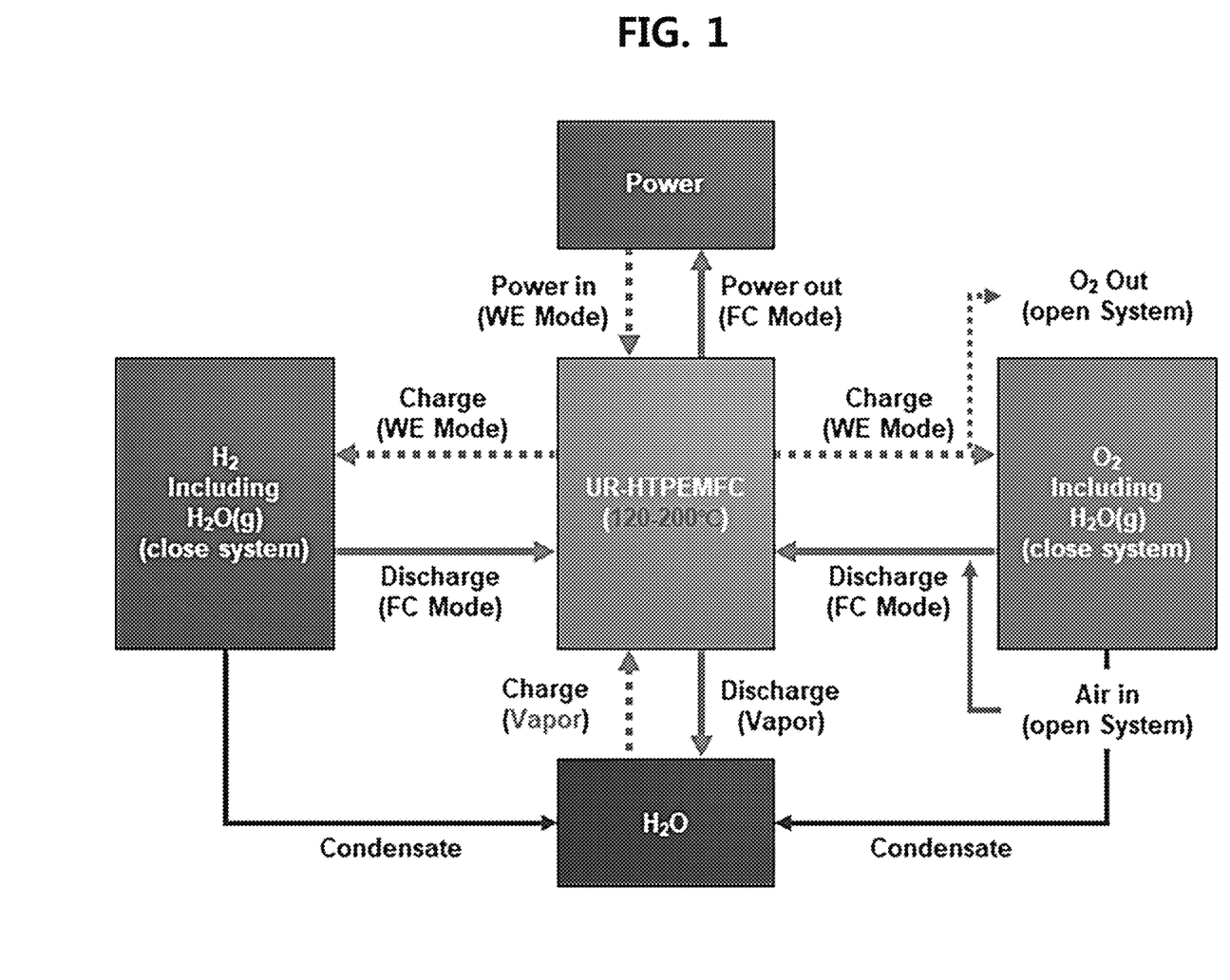
FIG. 1 is a conceptual diagram illustrating a method (or a system) for operating a unitized regenerative fuel cell according to an exemplary embodiment of the present disclosure.

Specifically, the membrane electrode assembly (MEA) for a unitized regenerative high temperature-type polymer electrolyte membrane fuel cell (UR-HTPEMFC) according to an exemplary embodiment of the present disclosure can be used at 120-200° C. since phosphoric acid, which is not evaporated in the temperature range of 120-200° C., is used as an electrolyte. As seen from FIG. 2, electrolysis of water vapor and power generation using hydrogen and oxygen can be achieved with one membrane electrode assembly (MEA) using a first electrode including OER and HOR/ORR catalysts and a second electrode not including an OER catalyst and including only a HER/HOR/ORR catalyst. The hydrogen and oxygen produced through the electrolysis may be recycled for power generation during fuel cell (FC) operation, as shown in FIG. 1.

The membrane electrode assembly for a unitized regenerative fuel cell according to an exemplary embodiment of the present disclosure is for use at 120° C. or above, or at 150° C. or above. If liquid water is supplied instead of water vapor at that temperature, cooling may occur and phosphoric acid may leak directly.

Accordingly, the high operation temperature (120° C. or above, or 150° C. or above) is favorable in that reaction rate is fast and material transport occurs more efficiently since water vapor is supplied instead of liquid water. In addition, the leakage of phosphoric acid is decreased as compared to when liquid water is supplied.

Figure 2:
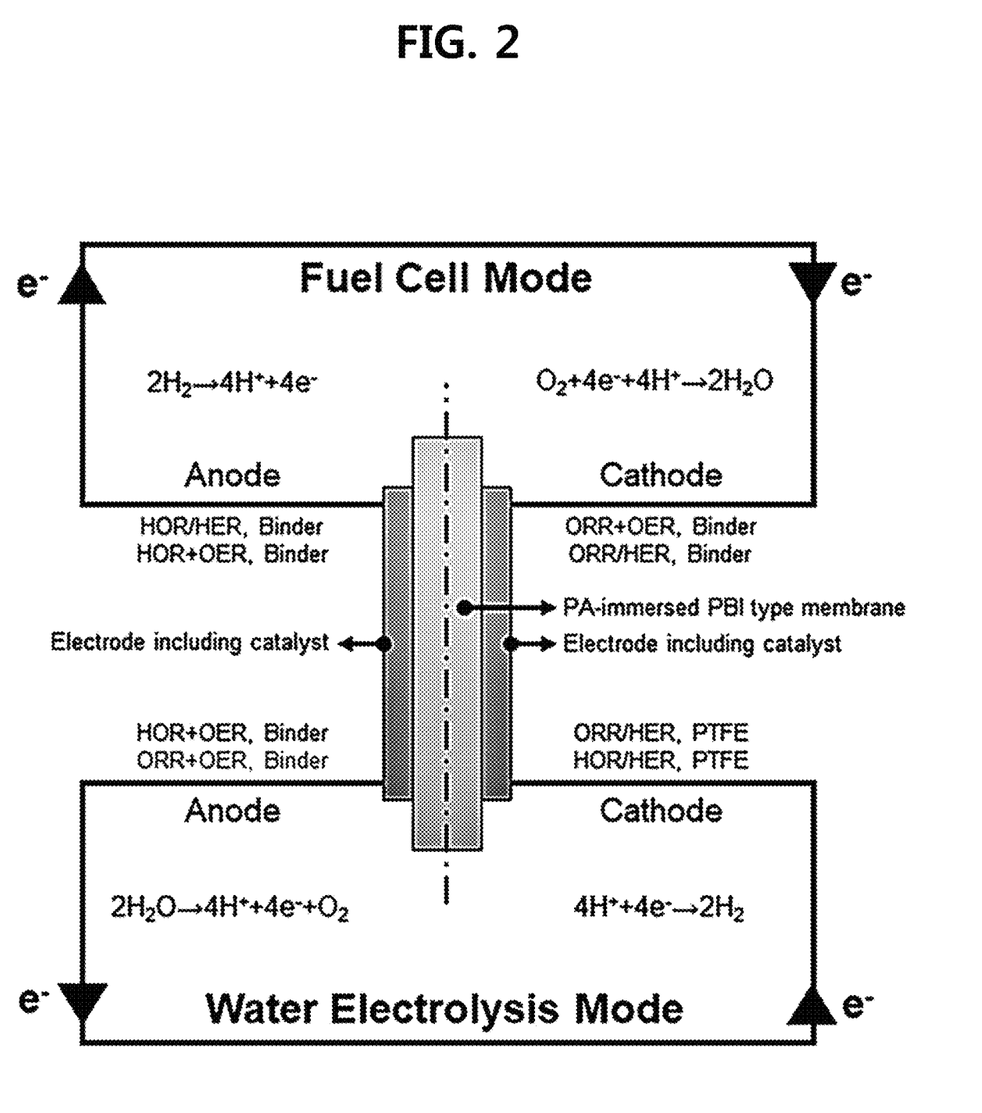
FIG. 2 is a conceptual diagram illustrating the principle of a unitized regenerative fuel cell according to an exemplary embodiment of the present disclosure.

Also, referring to FIG. 2, the membrane electrode assembly (MEA) according to an exemplary embodiment of the present disclosure uses a first electrode (oxidation electrode during water electrolysis operation) including an OER catalyst and an ORR/HOR catalyst and a second electrode (reduction electrode during water electrolysis operation) including only a HOR/HER/ORR catalyst. The ORR/HOR catalyst and the HOR/HER/ORR catalyst are bifunctional catalysts, each of which may be used for either an oxidation electrode or a reduction electrode during fuel cell operation.

In an exemplary embodiment, the first electrode may be an oxidation electrode during water electrolysis operation and an oxidation electrode during fuel cell operation. And, the second electrode may be a reduction electrode during water electrolysis operation and a reduction electrode during fuel cell operation. This is opposite to the electrodes for the existing unitized regenerative fuel cell operation. Through this, the problem of significantly increased resistance to material transport owing to water flooding in the electrode during fuel cell operation, which is caused by the hydrophilic property of the OER catalyst, can be overcome.

In an exemplary embodiment, the OER (oxygen evolution reaction) catalyst may be one or more selected from a group consisting of Ru, Ir and $Ir_2O$, the HOR (hydrogen oxidation reaction)/ORR (oxygen reduction reaction) catalyst may be one or more selected from a group consisting of Pt, Pt/C, $Pt_3Ni$, $Pt_3Co$, $Pt_3Fe$, Pd and Pd-M, and the HOR (hydrogen oxidation reaction)/HER (hydrogen evolution reaction)/ORR (oxygen reduction reaction) catalyst may be one or more selected from a group consisting of Pt, NiMo, CoMo, NiW, NiMoCo and NiMoFe, wherein M may be one selected from a group consisting of Co, Fe, Ni, Cr, Mn, Ti, V, Sn, Cu, Ir, Ag, Rh, Au and Pt.

A gas diffusion layer (substrate) of the first electrode including the OER catalyst may be porous titanium paper, titanium mesh, gold, tantalum, etc., and a gas diffusion layer (or substrate) of the second electrode may be porous carbon paper or carbon fiber.

In an exemplary embodiment, the first electrode may include a titanium substrate; an $Ir_2O$ layer formed on the substrate through electroplating; and a Pt layer formed on the $Ir_2O$ layer through spraying, and the second electrode may include: a carbon substrate; and Pt or a Pt alloy formed on the substrate.

In an exemplary embodiment, the polymer electrolyte membrane capable of conducting cations between the two electrodes may be a PBI-based polymer electrolyte membrane (or a polymer with good heat resistance and acid resistance) in which a phosphoric acid-based electrolyte is doped, since the phosphoric acid enables endurance at high temperatures. Specifically, the membrane electrode assembly according to an exemplary embodiment of the present disclosure can be operated at high temperatures due to the phosphoric acid doped in the PBI-based polymer, since phosphoric acid has ion conductivity above 120° C.

In an exemplary embodiment, the water vapor supply unit may supply water vapor to the first electrode through ultrasonic humidification or direct vaporization.

Figure 3A:
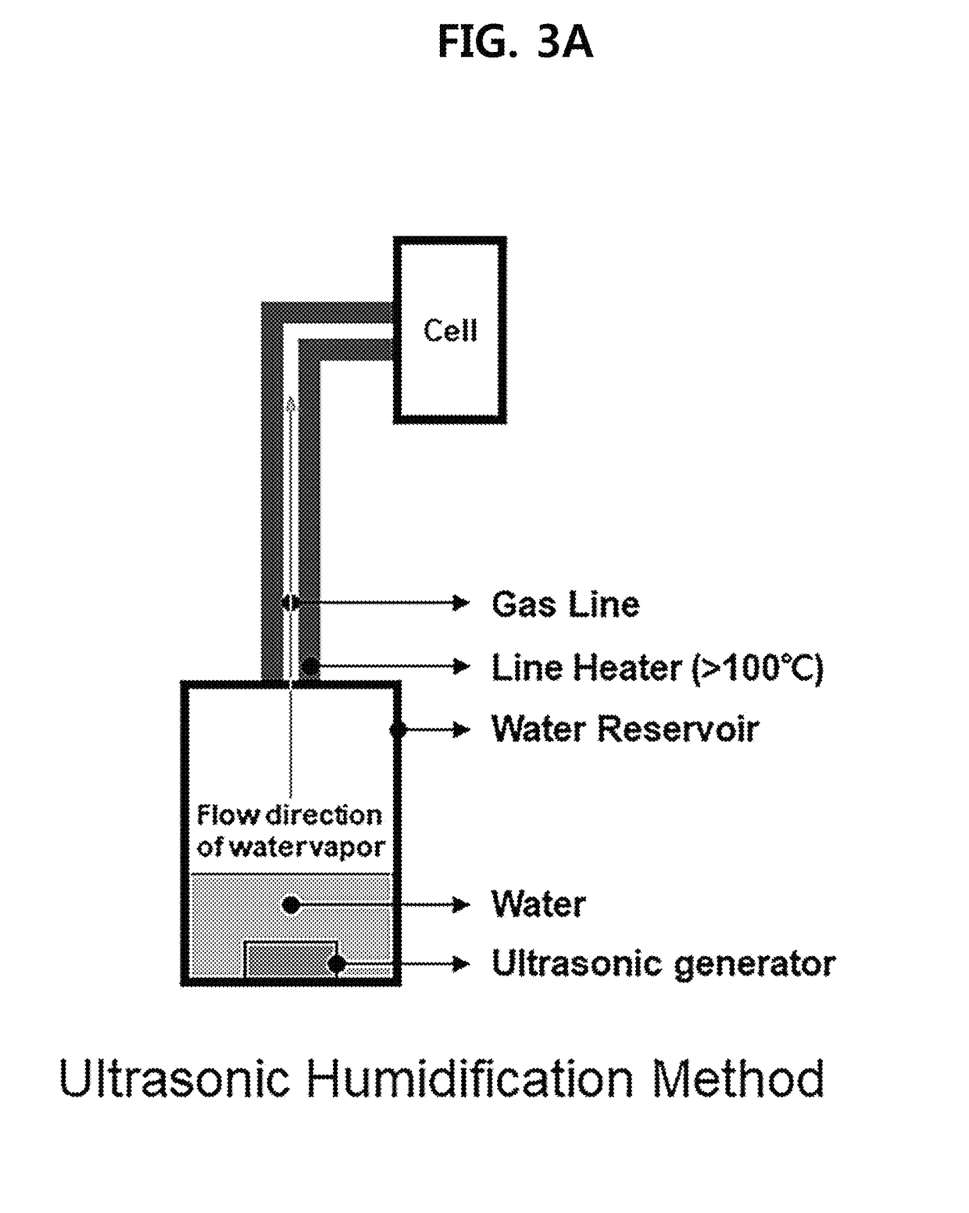
FIGS. 3A and 3B illustrate the supply of water vapor in a unitized regenerative fuel cell according to an exemplary embodiment of the present disclosure.
Figure 3B:
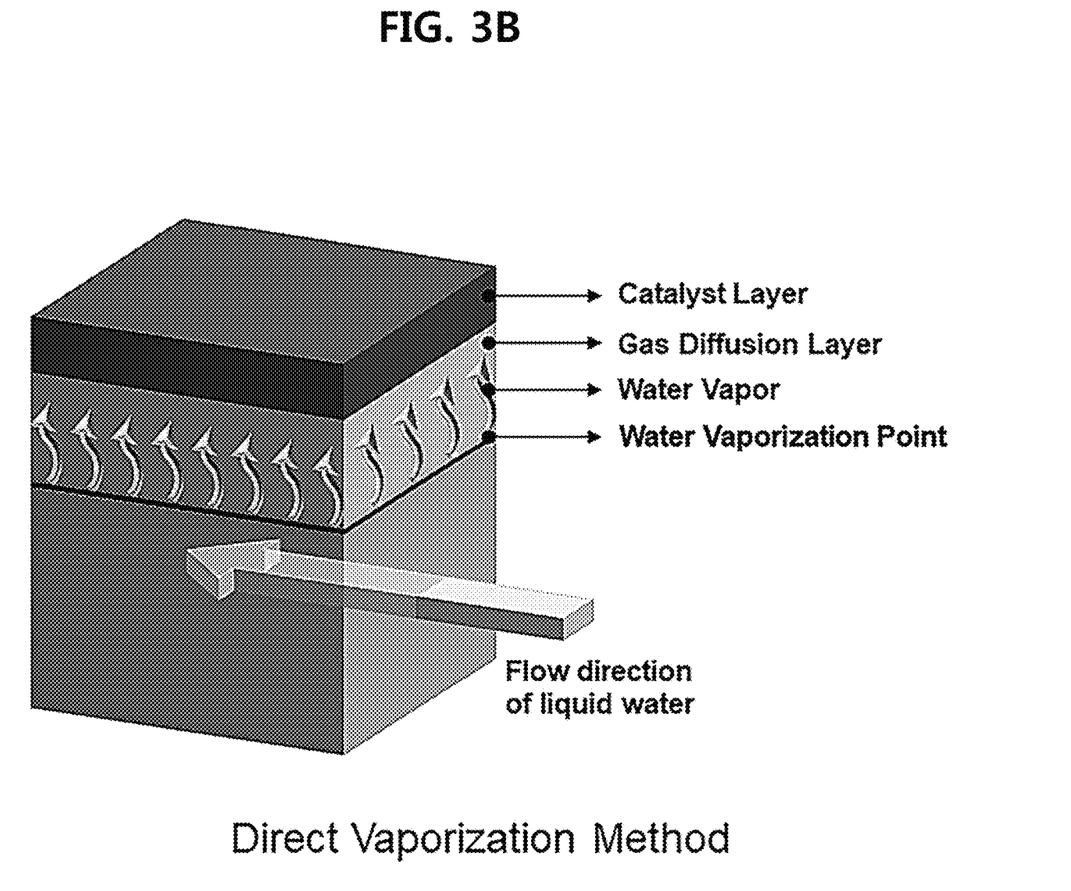

Specifically, referring to FIGS. 3A and 3B, in exemplary embodiments of the present disclosure, water vapor may be generated by different methods.

First, in the ultrasonic humidification method (FIG. 3A), liquid water is prepared into small water droplets by an ultrasonic generator and then turned into water vapor by a line heater (100° C. or above).

In the direct vaporization method (FIG. 3B), water of a given flow rate is supplied as it is vaporized directly between a flow channel of a bipolar plate and the gas diffusion layer of the first electrode. Specifically, when the membrane electrode assembly according to an exemplary embodiment of the present disclosure is applied to a unitized regenerative fuel cell, it is configured in the order of BP (bipolar plate)-GDL (gas diffusion layer)-catalyst-membrane-catalyst-GDL-BP. Water is vaporized between the BP and the GDL. The rear side of the gas diffusion layer may be given hydrophobic property to prevent permeation of water.

Figure 6:
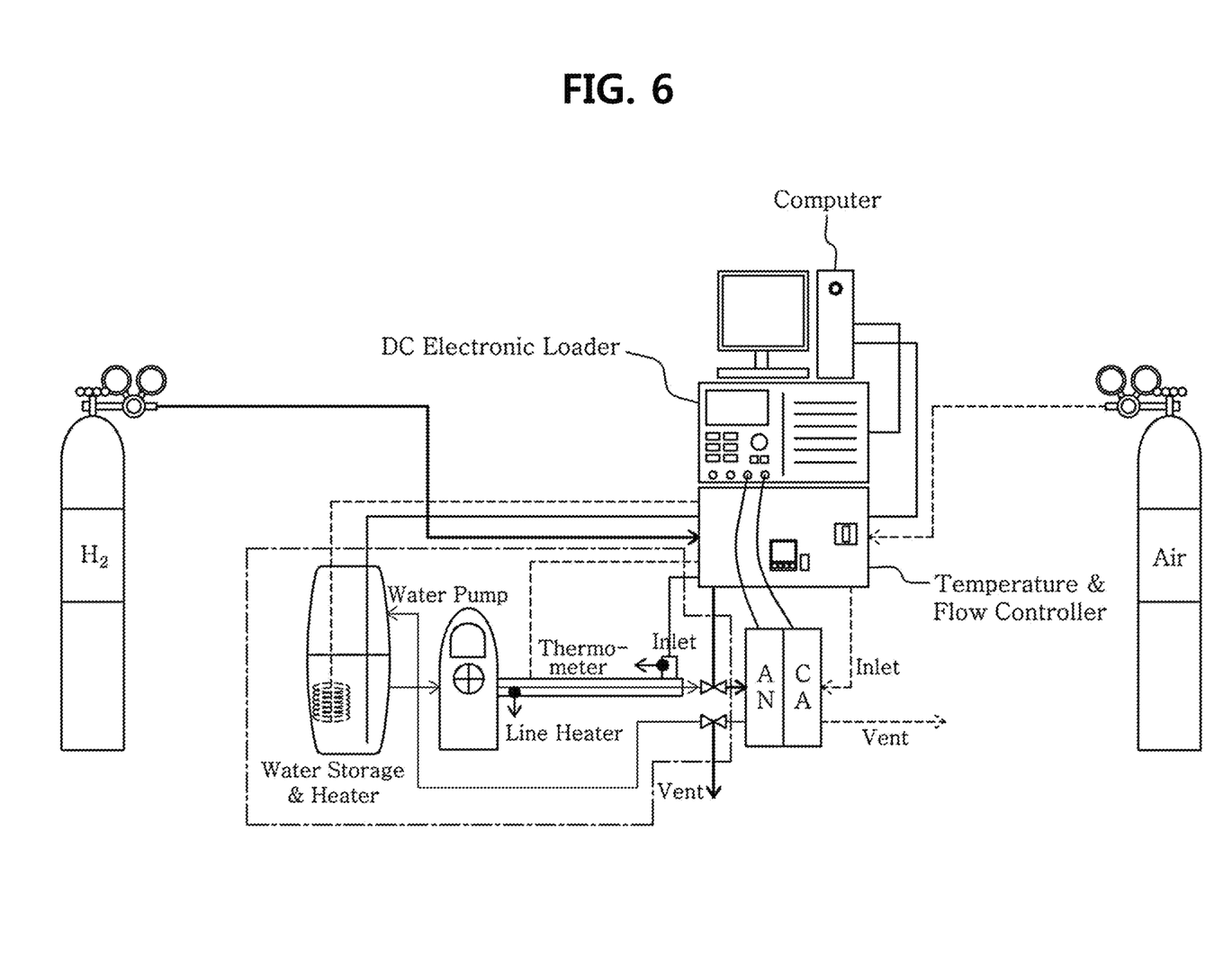
FIG. 6 shows FIG. 3B seen from a distance.

Specifically, referring to FIG. 6, which shows FIG. 3B seen from a distance, water heated firstly in a water reservoir may be transferred to the line heater using a pump, and then heated secondly by the line heater before it is supplied to a unit cell at 150° C. Through this sequential heating, the thermal efficiency of the unit cell can be maximized.

In an exemplary embodiment, the membrane electrode assembly for a unitized regenerative fuel cell may be for use when the electrolyte is phosphoric acid. In an exemplary embodiment, the membrane electrode assembly for a unitized regenerative fuel cell may be for use above 120° C. or above 150° C.

For example, the membrane electrode assembly for a unitized regenerative fuel cell may be for use above 130° C., above 140° C. or above 150° C., and below 200° C. At temperatures below 120° C., high-purity hydrogen should be used and heat recovery rate is relatively low. And, at temperatures above 200° C., the electrolyte may be lost due to the evaporation of phosphoric acid and the cation conductivity of the electrolyte may decrease as the phosphoric acid is turned to polyphosphoric acid.

Exemplary embodiments of the present disclosure also provide a unitized regenerative fuel cell including the membrane electrode assembly for a unitized regenerative fuel cell described above.

Method for Operating Unitized Regenerative Fuel Cell

Exemplary embodiments of the present disclosure provide a method for operating a unitized regenerative fuel cell, wherein the method for operating a unitized regenerative fuel cell includes: a water electrolysis operation step wherein the first electrode is used as an oxidation electrode and the second electrode is used as a reduction electrode; and a fuel cell operation step wherein the first electrode is used as an oxidation electrode or a reduction electrode and the second electrode is used as a reduction electrode or an oxidation electrode, and water vapor is supplied to the first electrode during the water electrolysis operation step.

Exemplary embodiments of the present disclosure provide a method for operating a unitized regenerative fuel cell, wherein the method for operating a unitized regenerative fuel cell includes: a water electrolysis operation step wherein the first electrode is used as an oxidation electrode and the second electrode is used as a reduction electrode; and a fuel cell operation step wherein the first electrode is used as an oxidation electrode or a reduction electrode and the second electrode is used as a reduction electrode or an oxidation electrode, and water vapor is supplied to the first electrode during the water electrolysis operation step, wherein the unitized regenerative fuel cell includes: a first electrode including an OER (oxygen evolution reaction) catalyst and a HOR (hydrogen oxidation reaction)/ORR (oxygen reduction reaction) catalyst; a second electrode including a HOR (hydrogen oxidation reaction)/HER (hydrogen evolution reaction)/ORR (oxygen reduction reaction) catalyst; a polymer electrolyte membrane capable of conducting cations, which is provided between the first electrode and the second electrode; and a water vapor supply unit for supplying water vapor to the first electrode.

The existing unitized regenerative fuel cells (URFCs) include a unitized regenerative polymer electrolyte membrane fuel cell (UR-PEMFC), a unitized regenerative alkaline fuel cell (UR-AFC), a unitized regenerative solid oxide fuel cell (UR-SOFC), etc. Among them, the UR-PEMFC is mainly used. Because the UR-PEMFC and the UR-AFC are operated at low temperatures, high-purity hydrogen should be used and heat recovery rate is relatively poor. And, the UR-SOFC is limited in applications because it is operated in a temperature range of 500–1000° C. Therefore, the present disclosure is directed to providing a unitized regenerative high temperature-type polymer electrolyte membrane fuel cell (UR-HTPEMFC) operated in the intermediate temperature range of 120-200° C., between the low-temperature and ultra-high-temperature ranges.

Referring to FIG. 1, the unitized regenerative fuel cell (UR-HTPEMFC) according to an exemplary embodiment of the present disclosure generates power in a fuel cell (FC) mode as oxygen (or oxygen-containing air) and hydrogen are supplied respectively to the reduction electrode and the oxidation electrode, while water produced together is stored. In a water electrolysis (WE) mode, the produced water (or externally supplied water) is vaporized (into water vapor) and then supplied to the first electrode. The water vapor is electrolyzed using externally applied power to produce hydrogen and oxygen. The produced gases are stored separately. The stored hydrogen and oxygen may be recycled for power generation. As described, one membrane electrode assembly (MEA) may be operated alternatingly in the water electrolysis (WE) mode and the fuel cell (FC) mode as a closed system (or open system).

In an exemplary embodiment, the method for operating a unitized regenerative fuel cell may include: a water electrolysis operation step wherein the first electrode is used as an oxidation electrode and the second electrode is used as a reduction electrode; and a fuel cell operation step wherein the first electrode is used as an oxidation electrode and the second electrode is used as a reduction electrode. As described above, the fuel cell may be operated by changing the location of the oxidation electrode/reduction electrode of the existing fuel cell operation method.

In an exemplary embodiment, the OER (oxygen evolution reaction) catalyst may be one or more selected from a group consisting of Ru, Ir and $Ir_2O$, the HOR (hydrogen oxidation reaction)/ORR (oxygen reduction reaction) catalyst may be one or more selected from a group consisting of Pt, Pt/C, $Pt_3Ni$, $Pt_3Co$, $Pt_3Fe$, Pd and Pd-M, and the HOR (hydrogen oxidation reaction)/HER (hydrogen evolution reaction)/ORR (oxygen reduction reaction) catalyst may be one or more selected from a group consisting of Pt, NiMo, CoMo, NiW, NiMoCo and NiMoFe, wherein M may be one selected from a group consisting of Co, Fe, Ni, Cr, Mn, Ti, V, Sn, Cu, Ir, Ag, Rh, Au and Pt.

A gas diffusion layer (substrate) of the first electrode including the OER catalyst may be porous titanium paper, titanium mesh, gold, tantalum, etc., and a gas diffusion layer (or substrate) of the second electrode may be porous carbon paper or carbon fiber.

In an exemplary embodiment, the first electrode may include: a titanium substrate; an $Ir_2O$ layer formed on the substrate through electroplating; and a Pt layer formed on the $Ir_2O$ layer through spraying, and the second electrode may include: a carbon substrate; and Pt or a Pt alloy formed on the substrate.

In an exemplary embodiment, the polymer electrolyte membrane may be a PBI-based polymer electrolyte membrane in which a phosphoric acid-based electrolyte is doped.

In an exemplary embodiment, the supply of water vapor may be achieved through ultrasonic humidification or direct vaporization.

In an exemplary embodiment, the electrolyte of the unitized regenerative fuel cell may be phosphoric acid. In an exemplary embodiment, the operating temperature of the unitized regenerative fuel cell may be 120° C. or above, or 150° C.

In general, higher reaction temperature is favorable in terms of reaction rate. Specifically, in order to decompose water and generate hydrogen and oxygen through an electrochemical reaction, an electrolyte is necessary for conduction of ions between a hydrogen-generating electrode and an oxygen-generating electrode. At temperatures above 100° C., water cannot be used as the electrolyte because it is vaporized. However, the membrane electrode assembly according to an exemplary embodiment of the present disclosure can be operated at the high temperature above 150° C. since phosphoric acid (boiling point 150° C.) is used as the electrolyte that allows ion transfer between the hydrogen electrode and the oxygen electrode, instead of water (boiling point 100° C.).

In addition, there are advantages that the voltage required to obtain the same current for water electrolysis is lower and the threshold voltage required to obtain the same current is lower at high temperature than at room temperature.

For example, the operating temperature of the unitized regenerative fuel cell may be 130° C. or above, 140° C. or above or 150° C. or above, and 200° C. or below. At temperatures below 120° C., high-purity hydrogen should be used and heat recovery rate is relatively low. And, at temperatures above 200° C., the electrolyte may be lost due to the evaporation of phosphoric acid and the cation conductivity of the electrolyte may decrease as the phosphoric acid is turned to polyphosphoric acid.

Hereinafter, the present disclosure will be described in detail through examples. However, the following examples are for illustrative purposes only and the scope of the present disclosure is not limited by the examples.

Examples

[Example] Preparation of First Electrode

A first electrode including: a titanium substrate; an iridium oxide ($IrO_2$) layer formed on the substrate through electroplating; and a platinum (Pt/C) layer formed on the iridium oxide ($IrO_2$) layer through spraying was prepared.

Specifically, iridium chloride hydrate ($IrCl_4$—$H_2O$), oxalic acid ($(COOH)_2.2H_2O$), hydrogen peroxide (35% $H_2O_2$) and anhydrous potassium carbonate were added to deionized (DI) water and subjected to magnetic stirring for 3 days.

Iridium oxide plating was performed on a titanium substrate at 0.7 V (vs. SCE) for 10 minutes using the prepared solution. After adding polytetrafluoroethylene (PTFE, 25%), deionized water and isopropyl alcohol to 46.2% Pt/C, a catalyst slurry was prepared through ultrasonic dispersion.

Then, Pt/C was coated on the prepared electrode so that an amount of the platinum (Pt) catalyst was 0.2 mg/cm$^2$.

The prepared electrode was used as an oxidation electrode (anode) in both a WE mode and an FC mode.

[Example] Preparation of Second Electrode

A BASF electrode (Celtec cathode) including Pt (0.7 mg/cm$^2$) and an alloy (nickel, 0.3 mg/cm$^2$) on a carbon substrate was used as a reduction electrode (cathode) in both the WE mode and the FC mode.

The oxidation electrode may also be prepared as follows. After adding 25% PTFE to 46.2% Pt/C and then adding deionized water, isopropyl alcohol and a surfactant, a catalyst slurry is prepared through ultrasonic dispersion using a homogenizer. The electrode may be prepared by coating the prepared ink on a gas diffusion layer (38BC, SGL), such that Pt/C is coated on the gas diffusion layer at 1.0 mg/cm$^2$ of the platinum (Pt) catalyst.

[Example] Synthesis of Phosphoric Acid-Doped p-Polybenzimidazole 3 g of dried 3,3'-diaminobenzidine (DAB) and 2.3497 g of terephthalic acid (TPA) were added to a four-necked round-bottom flask and then stirred for 1 hour at 80° C. Then, after adding 125 g of polyphosphoric acid (PPA), the temperature was raised to 150° C. The mixture was kept at 150° C. for 15 hours and then heated immediately to 220° C. Then, after terminating the reaction by adding a phosphoric acid solution at the maximum viscosity of the mixture, the mixture was stirred for 1 hour. After stirring further for 1 hour for degassing, the polymer mixture at 220° C. was poured onto a glass plate and then cast immediately using a doctor blade. The PPA of the cast polymer was hydrolyzed to phosphoric acid in a thermohydrostat under the condition of 50° C. and RH 80% for 24 hours.

[Example] Preparation of Membrane Electrode Assembly

The prepared p-polybenzimidazole (p-PBI) electrolyte membrane was heat-treated in an oven at 130° C. for 30 minutes. A phosphoric acid:ethanol (1:6) mixture solution was injected to a second electrode (commercially available BASF electrode) using a brush. The mixture solution-injected electrode was heat-treated in an oven at 130° C. for 1 hour, so that the ethanol was removed and the phosphoric acid was dispersed uniformly in the electrode. The heat-treated polymer electrolyte membrane and electrode were assembled into a unit cell quickly within 10 minutes together with Teflon and Kapton gaskets. The active area of the assembled unit cell was 7.84 cm$^2$.

[Example] Operation of UR-HTPEMFC in FC Mode

Figure 4:
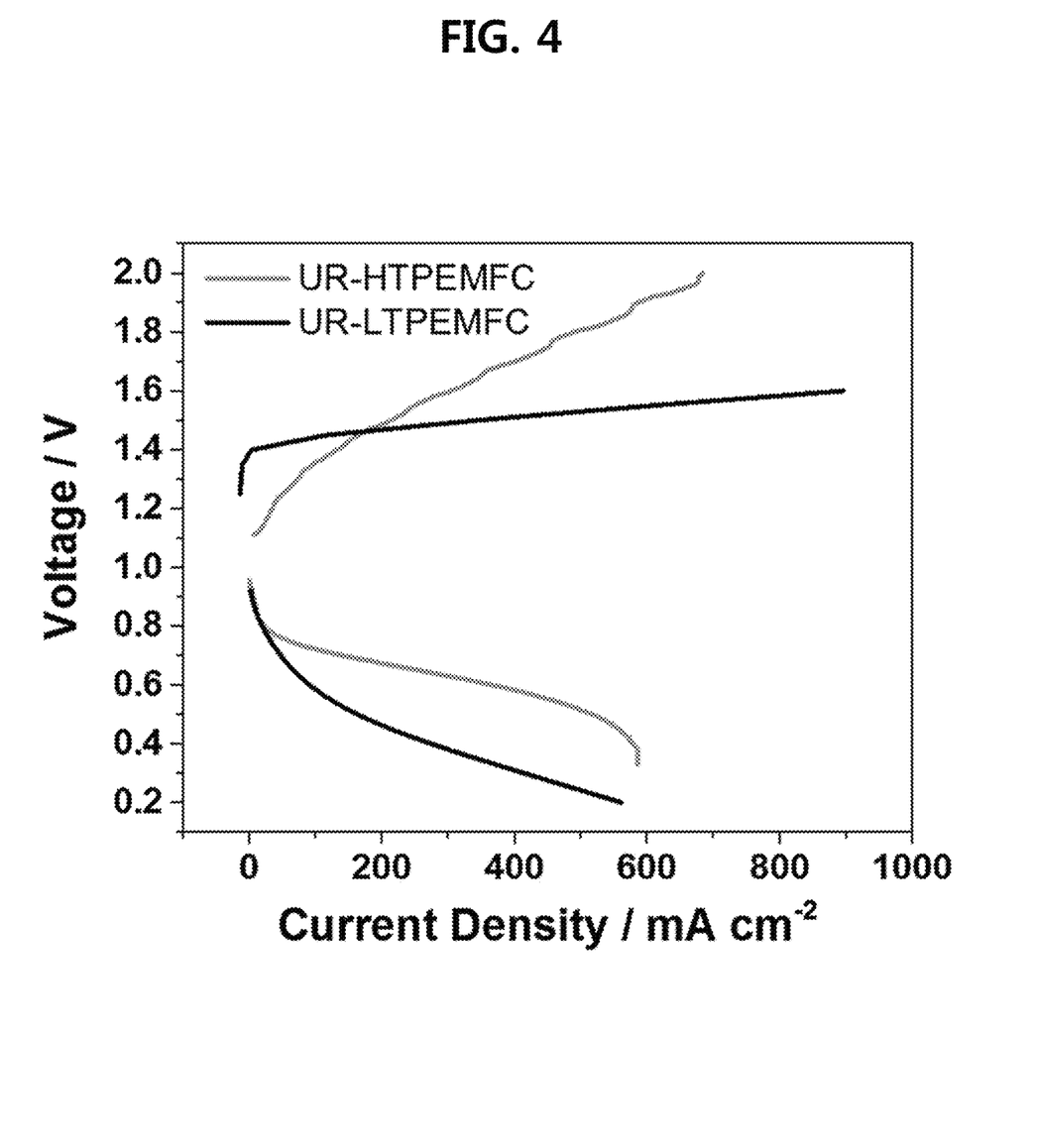
FIG. 4 shows the current density-voltage curves of a unitized regenerative fuel cell according to an exemplary embodiment of the present disclosure in fuel cell (FC) and water electrolysis (WE) operation modes.

The prepared unit cell was heated at 150° C. under nitrogen purging and then maintained at 150° C. for 20 minutes. Then, hydrogen and air were supplied to the first electrode and the second electrode for 10 minutes without humidification respectively at a flow rate of 100 mL/min and 300 mL/min. Then, the fuel cell performance was evaluated using a current density-voltage curve. The result is shown in FIG. 4.

[Example] Operation of UR-HTPEMFC in WE Mode

After the evaluation in the FC mode, the unit cell was kept at 150° C. under nitrogen purging and then maintained at 150° C. for 20 minutes. For electrolysis, water was supplied to the first electrode at a flow rate of 3 mL/min, and the supplied water was converted to water vapor directly in the gas diffusion layer (direct vaporization). Then, the electrolysis performance was evaluated using a current density-voltage curve. The result is shown in FIG. 4.

[Comparative Example] Operation of UR-PEMFC (Performance of Existing URFC)

A URFC was operated with the cell temperature maintained at 80° C. An oxidation electrode was prepared by coating a platinum catalyst on an iridium oxide-plated titanium gas diffusion layer to 0.3 mg/cm$^2$ through spraying. A reduction electrode was prepared by coating Pt/C on a carbon gas diffusion layer (10BC) to 0.4 mg/cm$^2$ through spraying. As a polymer electrolyte membrane, the commercially available Nafion 212 membrane was used. In the WE mode, electrolysis performance was evaluated using a current density-voltage curve while supplying water to the oxidation electrode at a rate of 15 mL/min. In the FC mode, hydrogen was supplied to the oxidation electrode and oxygen was supplied to the reduction electrode at a flow rate of 400 mL/min under the condition of relative humidity 66%. Performance evaluation was performed using a current density-voltage curve as in the water electrolysis evaluation.

FIG. 4 shows the current density-voltage curves of the unitized regenerative high temperature-type polymer electrolyte membrane fuel cell (UR-HTPEMFC) according to an exemplary embodiment of the present disclosure in the fuel cell (FC) and water electrolysis (WE) modes.

It can be seen that the UR-HTPEMFC can perform hydrogen production and power generation with one MEA and it shows very low threshold voltage and resistance as compared to the existing UR-PEMFC (UR-LTPEMFC). Because the thermodynamic inception voltage decreases at high temperature, water electrolysis can begin at low voltage. In addition, because the thermodynamic activity and ion conductivity of the catalyst are improved as the temperature increases, the performance is excellent particularly in the low-voltage range as compared to the existing low-temperature water electrolysis.

As seen from FIG. 4, whereas the electrolysis begins around 1.4 V for the low-temperature water electrolysis, the electrolysis begins at 1.1 V for the high-temperature water electrolysis. In addition, the performance is better for the high-temperature water electrolysis than for the low-temperature water electrolysis in the low-voltage range below 1.45 V.

Furthermore, the high-temperature fuel cell operation can solve the problem of performance degradation due to water flooding occurring in the electrode during fuel cell operation at low temperature under non-humidified condition. The recycling efficiency of the UR-HTPEMFC at 400 mA/cm$^2$ was better (34.2%) than that of the UR-PEMFC (UR-LTPEMFC, 20.5%).

[Comparative Example] Operation of UR-HTPEMFC (Water Supplied Instead of Water Vapor)

Figure 5:
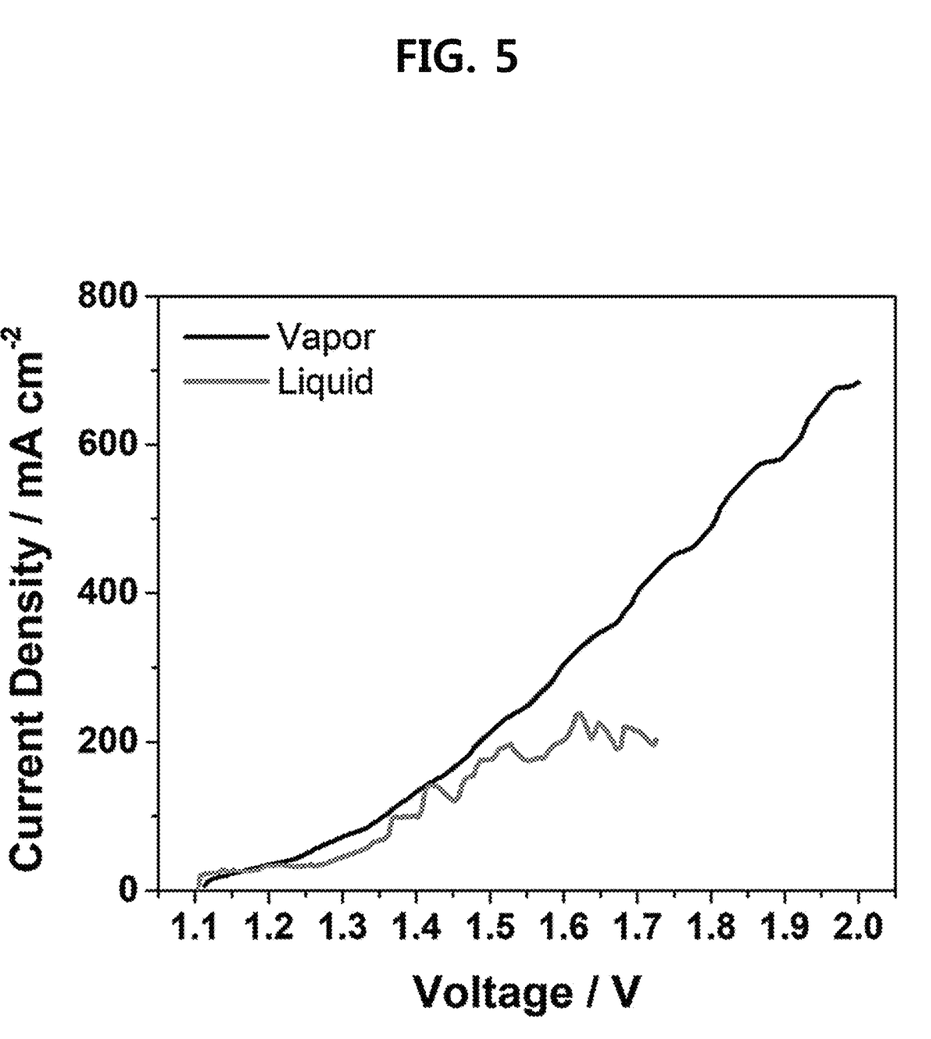
FIG. 5 shows the operating performance of a unitized regenerative fuel cell according to an exemplary embodiment of the present disclosure when water is supplied instead of water vapor.

The performance of the UR-HTPEMFC prepared in Example was compared while supplying water instead of water vapor. As seen from FIG. 5, when liquid water was supplied instead of water vapor, the performance was decreased fast and was unstable due to accelerated loss of phosphoric acid.

What is claimed is:

1. A membrane electrode assembly for a unitized regenerative fuel cell, comprising:
    a first electrode comprising an OER (oxygen evolution reaction) catalyst and a HOR (hydrogen oxidation reaction)/ORR (oxygen reduction reaction) catalyst;
    a second electrode comprising a HOR (hydrogen oxidation reaction)/HER (hydrogen evolution reaction)/ORR (oxygen reduction reaction) catalyst;

a polymer electrolyte membrane capable of conducting cations, which is provided between the first electrode and the second electrode; and a water vapor supply unit for supplying water vapor to the first electrode, wherein the first electrode is an oxidation electrode during water electrolysis operation and an oxidation electrode or a reduction electrode during fuel cell operation, and the second electrode is a reduction electrode during water electrolysis operation and an oxidation electrode or a reduction electrode during fuel cell operation.

2. The membrane electrode assembly for a unitized regenerative fuel cell according to claim 1, wherein
the first electrode is an oxidation electrode during water electrolysis operation and an oxidation electrode during fuel cell operation, and
the second electrode is a reduction electrode during water electrolysis operation and a reduction electrode during fuel cell operation.

3. The membrane electrode assembly for a unitized regenerative fuel cell according to claim 1, wherein
the OER (oxygen evolution reaction) catalyst is one or more selected from a group consisting of Ru, Ir and $Ir_2O$,
the HOR (hydrogen oxidation reaction)/ORR (oxygen reduction reaction) catalyst is one or more selected from a group consisting of Pt, Pt/C, $Pt_3Ni$, $Pt_3Co$, $Pt_3Fe$, Pd and Pd-M, and
the HOR (hydrogen oxidation reaction)/HER (hydrogen evolution reaction)/ORR (oxygen reduction reaction) catalyst is one or more selected from a group consisting of Pt, NiMo, CoMo, NiW, NiMoCo and NiMoFe,
wherein M is one selected from a group consisting of Co, Fe, Ni, Cr, Mn, Ti, V, Sn, Cu, Ir, Ag, Rh, Au and Pt.

4. The membrane electrode assembly for a unitized regenerative fuel cell according to claim 1, wherein
the first electrode comprises: a titanium substrate; an $Ir_2O$ layer formed on the substrate through electroplating; and a Pt layer formed on the $Ir_2O$ layer through spraying, and
the second electrode comprises: a carbon substrate; and Pt or a Pt alloy formed on the substrate.

5. The membrane electrode assembly for a unitized regenerative fuel cell according to claim 1, wherein the polymer electrolyte membrane is a PBI-based polymer electrolyte membrane wherein a phosphoric acid-based electrolyte is doped.

6. The membrane electrode assembly for a unitized regenerative fuel cell according to claim 1, wherein the water vapor supply unit supplies water vapor to the first electrode through ultrasonic humidification or direct vaporization.

7. The membrane electrode assembly for a unitized regenerative fuel cell according to claim 1, wherein the membrane electrode assembly for a unitized regenerative fuel cell is for use at 120° C. or above.

8. A unitized regenerative fuel cell comprising the membrane electrode assembly for a unitized regenerative fuel cell according to claim 1.

9. A method for operating a unitized regenerative fuel cell, comprising:
a water electrolysis operation step wherein the first electrode is used as an oxidation electrode and the second electrode is used as a reduction electrode; and
a fuel cell operation step wherein the first electrode is used as an oxidation electrode or a reduction electrode and the second electrode is used as a reduction electrode or an oxidation electrode, and
wherein water vapor is supplied to the first electrode during the water electrolysis operation step,
wherein the unitized regenerative fuel cell comprises:
a first electrode comprising an OER (oxygen evolution reaction) catalyst and a HOR (hydrogen oxidation reaction)/ORR (oxygen reduction reaction) catalyst;
a second electrode comprising a HOR (hydrogen oxidation reaction)/HER (hydrogen evolution reaction)/ORR (oxygen reduction reaction) catalyst;
a polymer electrolyte membrane capable of conducting cations, which is provided between the first electrode and the second electrode; and
a water vapor supply unit for supplying water vapor to the first electrode.

10. The method for operating a unitized regenerative fuel cell according to claim 9, wherein the method for operating a unitized regenerative fuel cell comprises:
a water electrolysis operation step wherein the first electrode is used as an oxidation electrode and the second electrode is used as a reduction electrode; and
a fuel cell operation step wherein the first electrode is used as an oxidation electrode and the second electrode is used as a reduction electrode.

11. The method for operating a unitized regenerative fuel cell according to claim 9, wherein
the OER (oxygen evolution reaction) catalyst is one or more selected from a group consisting of Ru, Ir and $Ir_2O$,
the HOR (hydrogen oxidation reaction)/ORR (oxygen reduction reaction) catalyst is one or more selected from a group consisting of Pt, Pt/C, $Pt_3Ni$, $Pt_3Co$, $Pt_3Fe$, Pd and Pd-M, and
the HOR (hydrogen oxidation reaction)/HER (hydrogen evolution reaction)/ORR (oxygen reduction reaction) catalyst is one or more selected from a group consisting of Pt, NiMo, CoMo, NiW, NiMoCo and NiMoFe,
wherein M is one selected from a group consisting of Co, Fe, Ni, Cr, Mn, Ti, V, Sn, Cu, Ir, Ag, Rh, Au and Pt.

12. The method for operating a unitized regenerative fuel cell according to claim 9, wherein
the first electrode comprises: a titanium substrate; an $Ir_2O$ layer formed on the substrate through electroplating; and a Pt layer formed on the $Ir_2O$ layer through spraying, and
the second electrode comprises: a carbon substrate; and Pt or a Pt alloy formed on the substrate.

13. The method for operating a unitized regenerative fuel cell according to claim 9, wherein the polymer electrolyte membrane is a PBI-based polymer electrolyte membrane wherein a phosphoric acid-based electrolyte is doped.

14. The method for operating a unitized regenerative fuel cell according to claim 9, wherein the supply of water vapor is achieved through ultrasonic humidification or direct vaporization.

15. The method for operating a unitized regenerative fuel cell according to claim 9, wherein the operating temperature of the unitized regenerative fuel cell is 120° C. or above.

16. The method for operating a unitized regenerative fuel cell according to claim 9, wherein the electrolyte of the unitized regenerative fuel cell is phosphoric acid.

* * * * *